(12) United States Patent
Jones et al.

(10) Patent No.: US 12,498,622 B2
(45) Date of Patent: Dec. 16, 2025

(54) CAMERA CLUTCH SYSTEM

(71) Applicant: Peak Design, San Francisco, CA (US)

(72) Inventors: Dane Jones, San Francisco, CA (US);
Arthur Viger, San Francisco, CA (US);
Matthew Thomas James, San Francisco, CA (US)

(73) Assignee: Peak Design, San Francisco, CA (US)

( * ) Notice: Subject to any disclaimer, the term of this patent is extended or adjusted under 35 U.S.C. 154(b) by 180 days.

(21) Appl. No.: 18/303,140

(22) Filed: Apr. 19, 2023

(65) Prior Publication Data

US 2024/0353742 A1    Oct. 24, 2024

(51) Int. Cl.
*G03B 17/56* (2021.01)

(52) U.S. Cl.
CPC .................. *G03B 17/561* (2013.01)

(58) Field of Classification Search
CPC .. G03B 17/561; G03B 17/563; G03B 17/566; F16M 13/00
See application file for complete search history.

(56) References Cited

U.S. PATENT DOCUMENTS

| | | | |
|---|---|---|---|
| D623,860 S | 9/2010 | Kope et al. | D3/327 |
| D623,861 S | 9/2010 | Kope et al. | D3/327 |
| 7,866,899 B2 | 1/2011 | Kope et al. | 396/423 |
| 7,980,771 B2 * | 7/2011 | Chamberlayne | G03B 17/561 396/423 |
| 8,047,729 B2 | 11/2011 | Kope et al. | 396/423 |
| D855,682 S | 8/2019 | Cunningham et al. | D16/237 |
| 11,211,963 B1 | 12/2021 | Cunningham et al. | H04B 1/3888 |
| 2013/0101278 A1* | 4/2013 | Xu | G03B 17/563 396/423 |
| 2014/0099093 A1* | 4/2014 | Johnson, Sr. | G03B 17/561 396/428 |
| 2015/0113772 A1 | 4/2015 | Dering et al. | A45F 3/14 |
| 2020/0133103 A1 | 4/2020 | Johnson et al. | G03B 17/561 |
| 2021/0041057 A1 | 2/2021 | Jankura et al. | F16M 13/02 |

OTHER PUBLICATIONS

Peak Design Clutch Camera Hand Strap (https://www.amazon.com/Peak-Design-CL-3-Quick-Attaching-Quick-Adjusting/dp/B07HP57XC4/ref=asc_df_B07HP57XC4?mcid=1cdc0cf9c44931fb884225c2330575dc&hvocijid=.5145928006324948973-B07HP57XC4-&hvexpln=73&tag=hyprod-20&linkCode=df0&hvadid=721245378154&hvpos=&hvnetw=g&hvrand=5145928006324948973&hvpone=&hvptwo=&hvqmt=&hvdev=c&hvdvcmdl=&hvlocint=&hvlocphy=9052971&hvtargid=pla-2281435179498&th=Sep. 1, 2018 Printed May 2025.*
Expertphotography with the extension .com/best-hand-grip-camera-straps, 2023, pp. 1-18.
International Search Report and Written Opinion in PCT/US23/19088 dated Jul. 18, 2023.

* cited by examiner

*Primary Examiner* — Christopher E Mahoney
(74) *Attorney, Agent, or Firm* — Licata & Tyrrell P.C.; Bridget C. Sciamanna

(57) ABSTRACT

A camera clutch system with a camera plate configured to transiently mount to a camera and a coupled to the camera plate and configured to attach to a camera body or the camera plate to form an opening or loop sized to accept less than four fingers of a user to secure a camera mounted to the camera plate to the user is provided.

10 Claims, 9 Drawing Sheets

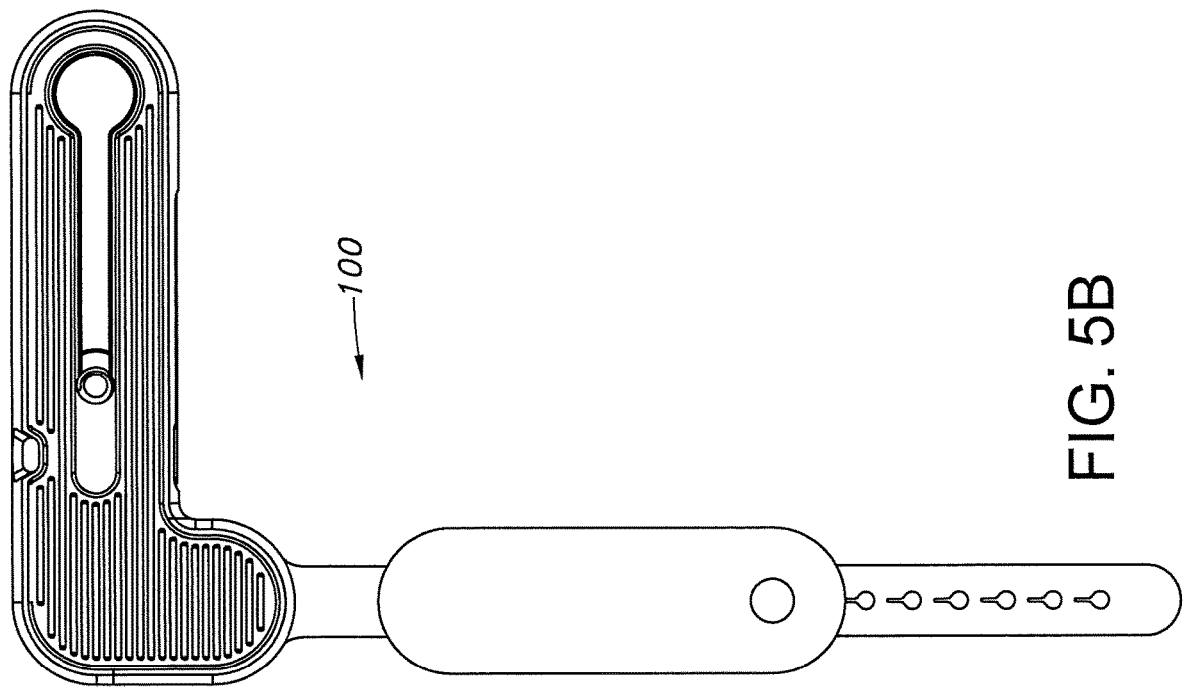
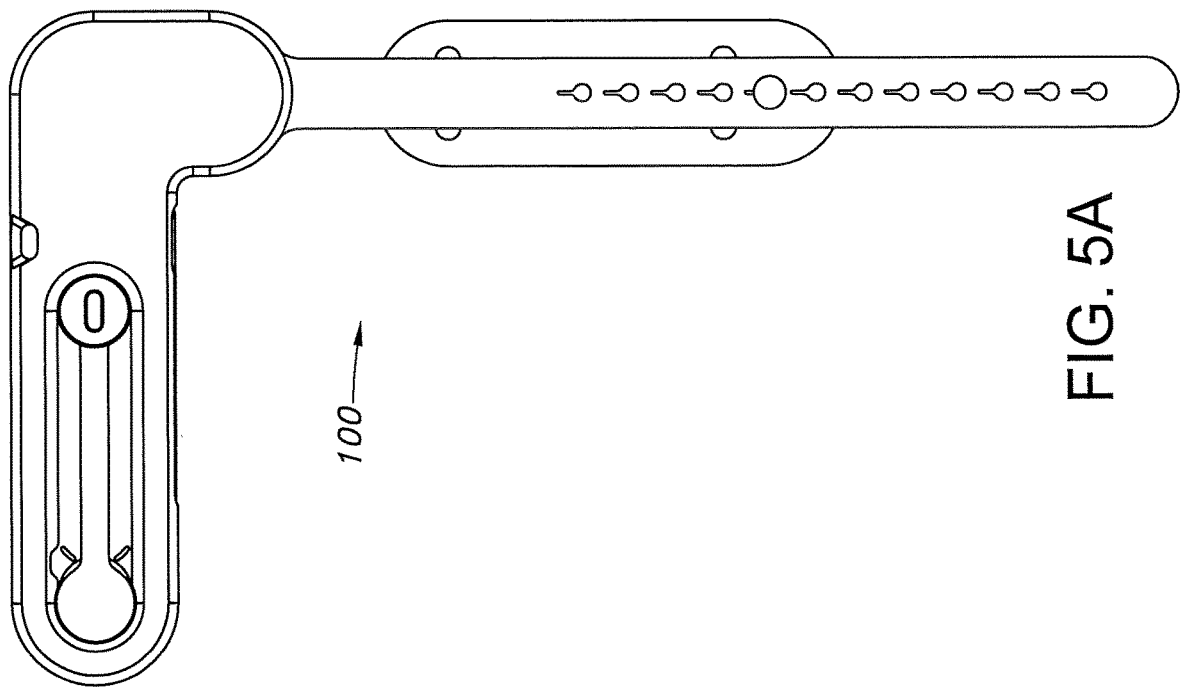
FIG. 5A
FIG. 5B

CAMERA CLUTCH SYSTEM

CROSS-REFERENCE TO RELATED APPLICATIONS

This patent application claims the benefit of priority from U.S. Provisional Application Ser. No. 63/332,391 filed Apr. 19, 2022, the teachings of which are herein incorporated by reference in their entirety.

BACKGROUND OF THE INVENTION

The problem of conveniently carrying, accessing, and using a camera under various operating conditions has existed since the beginning of hand-held photography. It has become even more of a problem in recent years as a growing number of photographers attempt to take action photographs while participating in fast-paced physical activities such as surfing, snorkeling, skiing, mountain biking, kayaking, rafting and so on. Activities such as these often leave a photographer without pockets, purses, or even enough time to fetch a camera from such a place if he or she hopes to get a photo of the action while it is occurring.

Further, even if a photographer is able to quickly access a camera during such an activity, an accidental fall or change of circumstances could make it difficult for the photographer to hold on to the camera. The camera could be damaged, broken or lost altogether in the event that the photographer might quickly need both of his or her hands free to ensure his or her safety.

Attempts to provide a solution to these problems such as rubber bands and wrist or neck ropes sometimes included with new cameras remain unsatisfactory.

U.S. Pat. Nos. 8,047,729 and 7,866,899 as well as U.S. Pat. No. D 623,860 and U.S. Pat. No. D 623,861 disclose a camera transport system and method including a strap and coupler typically worn over the shoulder of a photographer.

U.S. Pat. No. D 855,862 discloses an ornamental design for a quick release camera wrist strap.

At expertphotography with the extension.com/best-hand-grip-camera-straps/a number of hand grip camera straps are compared which keep your camera in your hand and give you a secure grip on the camera at all times. The straps provide security against accidentally dropping the camera while allowing for quick activation.

SUMMARY OF THE INVENTION

An aspect of the present invention relates to a camera clutch system with a camera plate and strap wherein the strap is configured to form an opening or loop sized to accept less than four fingers.

In one nonlimiting embodiment, the camera clutch system comprises a camera plate with an inner face and an outer face and a first end and second end with the first end being configured to transiently mount to a camera. The camera clutch system further comprises a strap with a first end and second end coupled to the camera plate via the first end and configured to attach to a camera body or the camera plate via the second end and which form an opening or loop sized to accept less than four fingers of a user to secure a camera mounted to the camera plate to the user.

In one nonlimiting embodiment, the strap of the camera clutch system is pivotably coupled to the camera plate at its second end.

In one nonlimiting embodiment, the strap of the camera clutch system is pivotably coupled to the camera body at is second end via a boss and strap receiving section arranged about the boss.

In one nonlimiting embodiment, the camera plate of the camera clutch system has a channel with a recess and a fastener which slidably fits within the channel and recess for coupling the camera plate to a camera at its first end. The slidably fitted fastener allows for rotation of a mounted camera to access a battery or memory card of a camera without removing the camera plate In one nonlimiting embodiment, the camera clutch system further comprises a tool transiently mounted to the camera clutch system and configured to cooperate with the fastener to mate the fastener with a corresponding feature on a camera to couple the camera plate to the camera. In one nonlimiting embodiment, the tool is mounted into a cavity in the camera plate. In one nonlimiting embodiment, the tool is held to the camera plate via magnets.

In one nonlimiting embodiment, the inner face of the camera plate comprises a textile liner to relieve contact pressure between the camera plate and a camera transiently mounted thereto.

Another aspect of this disclosure relates to a camera clutch system with a camera plate having a channel with a recess and a fastener which slidably fits within the channel and recess for coupling the camera plate to a camera at its first end, a strap configured to form an opening or loop size to accept less than four fingers, and a second fastener which transiently couples the camera plate to a tripod, wherein the second fastener has a protrusion which fits within the recess or channel of the camera plate.

BRIEF DESCRIPTION OF DRAWINGS

FIGS. 5A and 5B are schematic representations showing inner and outer faces of a camera clutch system of this disclosure with an alternative L-shaped camera plate.

DETAILED DESCRIPTION OF THE INVENTION

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

This disclosure relates to camera clutch systems with a camera plate and strap configured to form an opening or loop sized to accept less than four fingers.

Figure 1:
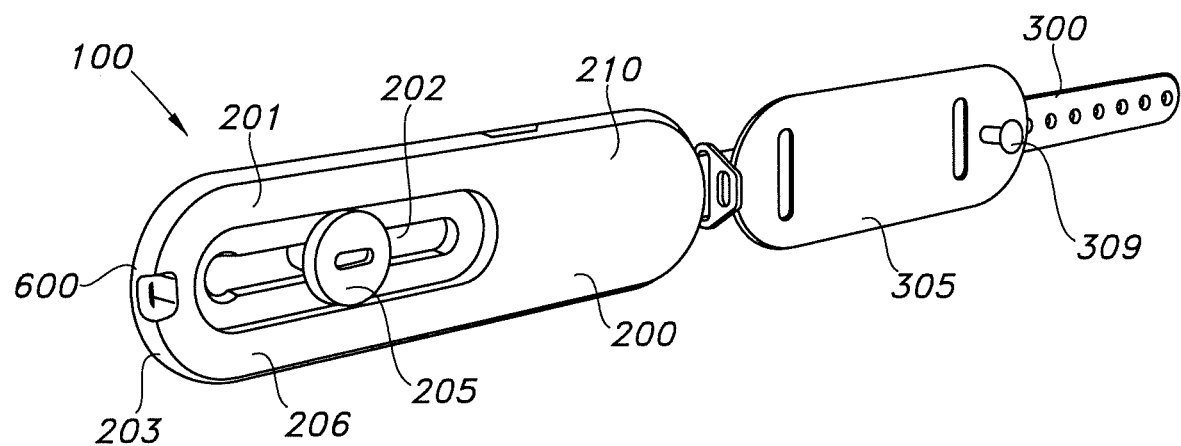
FIG. 1 is a schematic representation showing the outer face of a camera clutch system of this disclosure.
Figure 2:
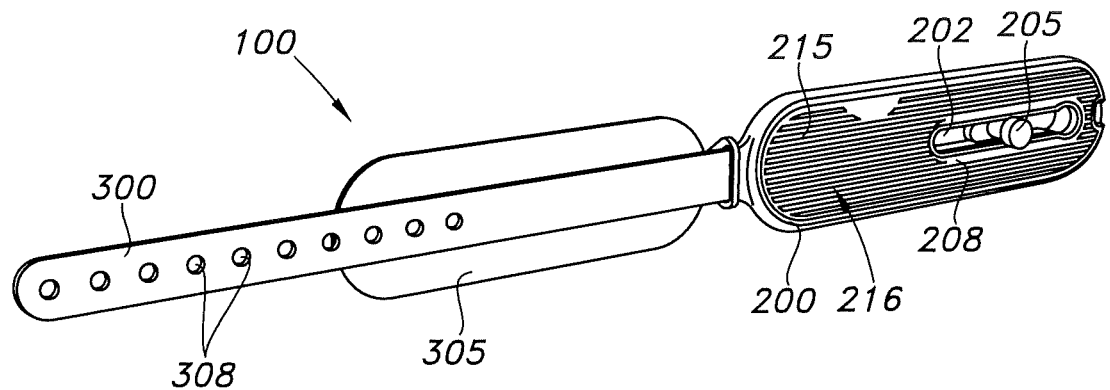
FIG. 2 is a schematic representation of the inner face of a camera clutch system of this disclosure.
Figure 3:
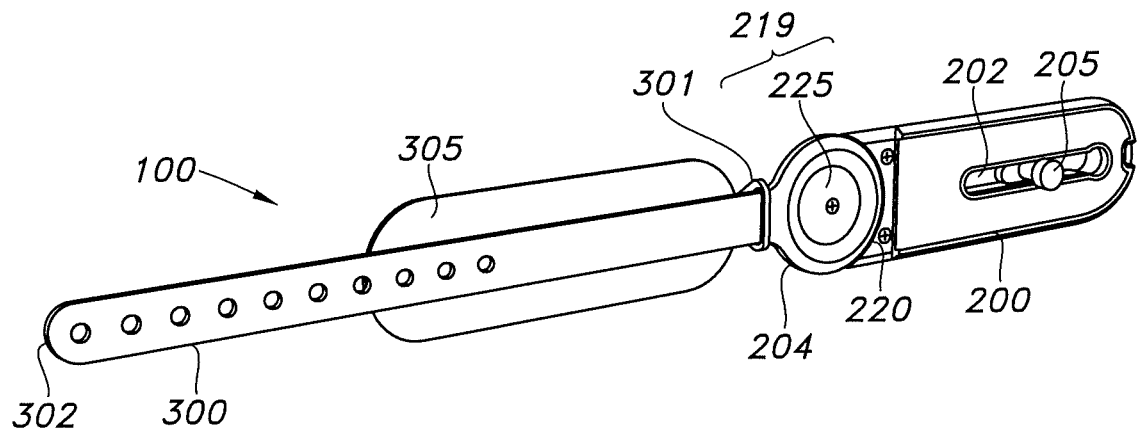
FIG. 3 is an internal view of a nonlimiting embodiment of a camera clutch with a pivotably coupled strap.
Figure 4:
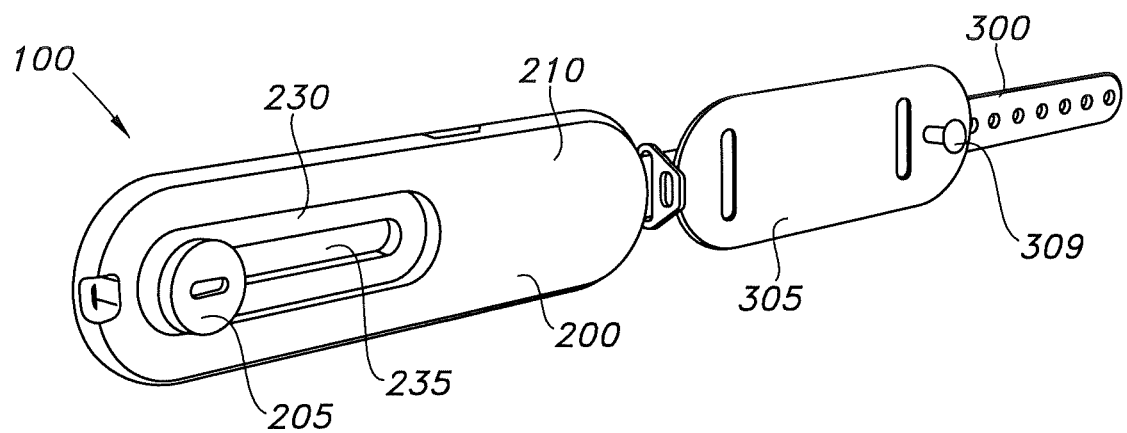
FIG. 4 is a schematic representation showing the outer face of a camera clutch system of this disclosure with a spacer fitted in the recess of the camera plate.
Figure 6:
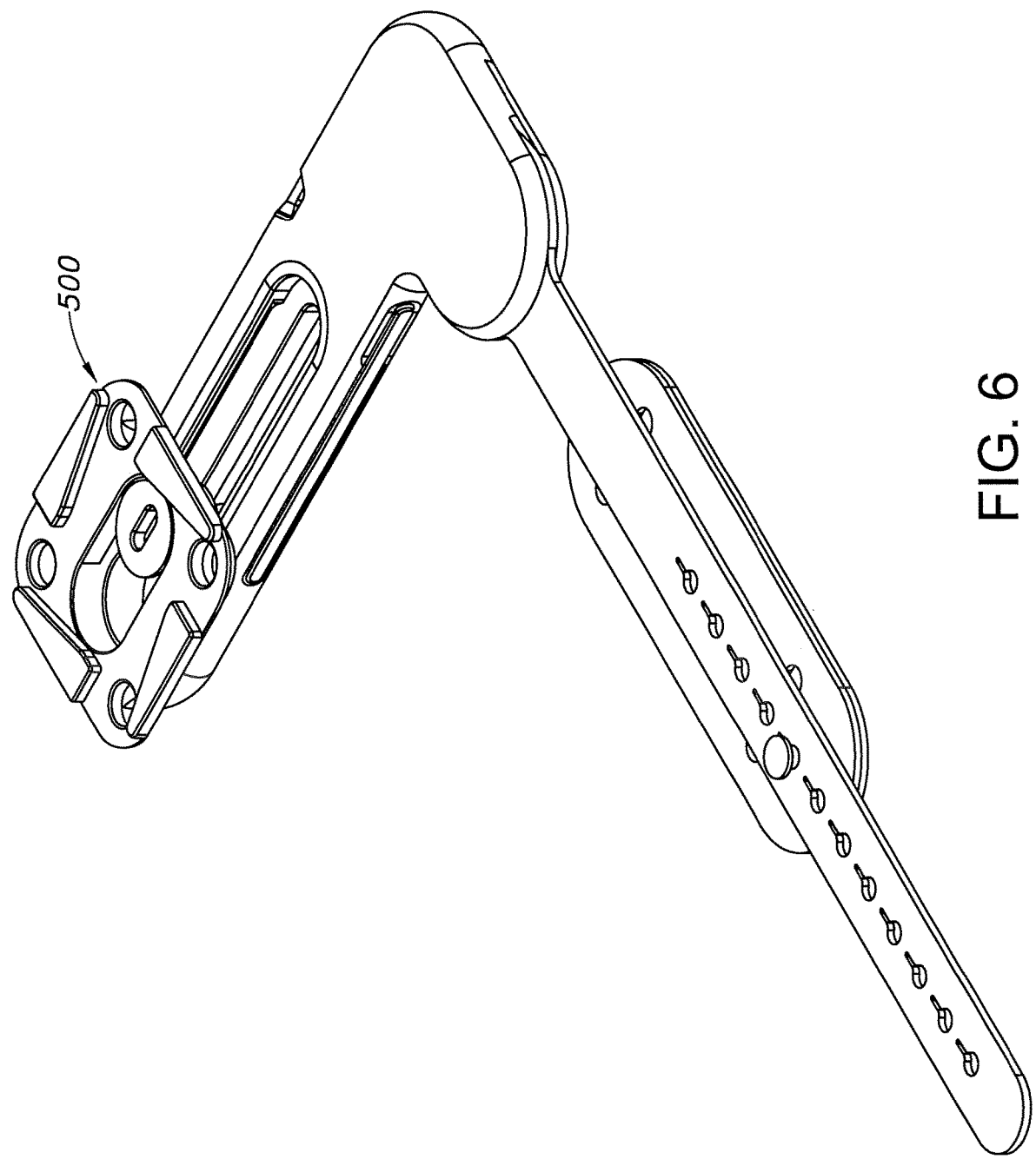
FIG. 6 is a schematic representation of the camera clutch system of FIGS. 5A and 5B with a tripod mount.
Figure 7A:
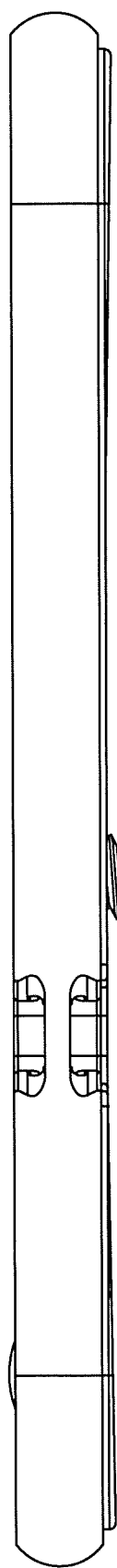
FIGS. 7A, 7B and 7B show a side view of the camera plate (FIG. 7A), a cross-sectional side view of the camera plate (FIG. 7B), and a side view of the camera plate with a tripod mount attached to the camera plate (FIG. 7C).
Figure 7B:
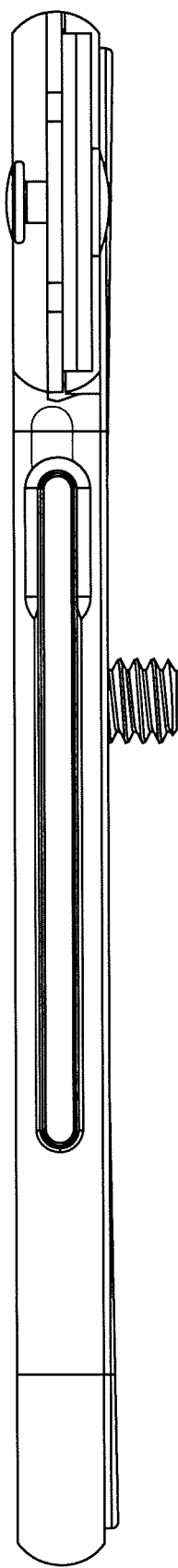
Figure 7C:
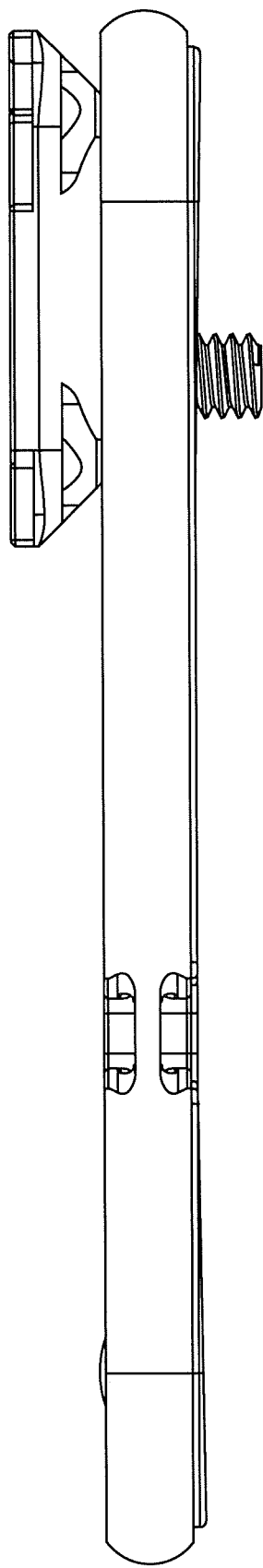
Figure 8A:
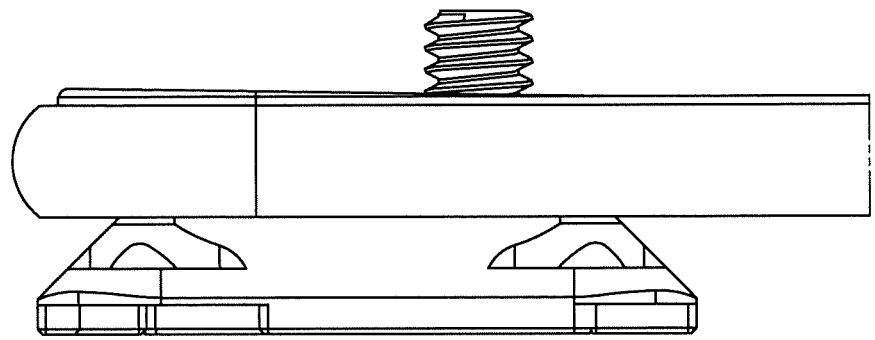
FIGS. 8A, 8B and 8C provide a closer view of the camera plate with a tripod mount attached thereto (FIGS. 8A and 8B) and these individual elements (FIG. 8C).
Figure 8B:
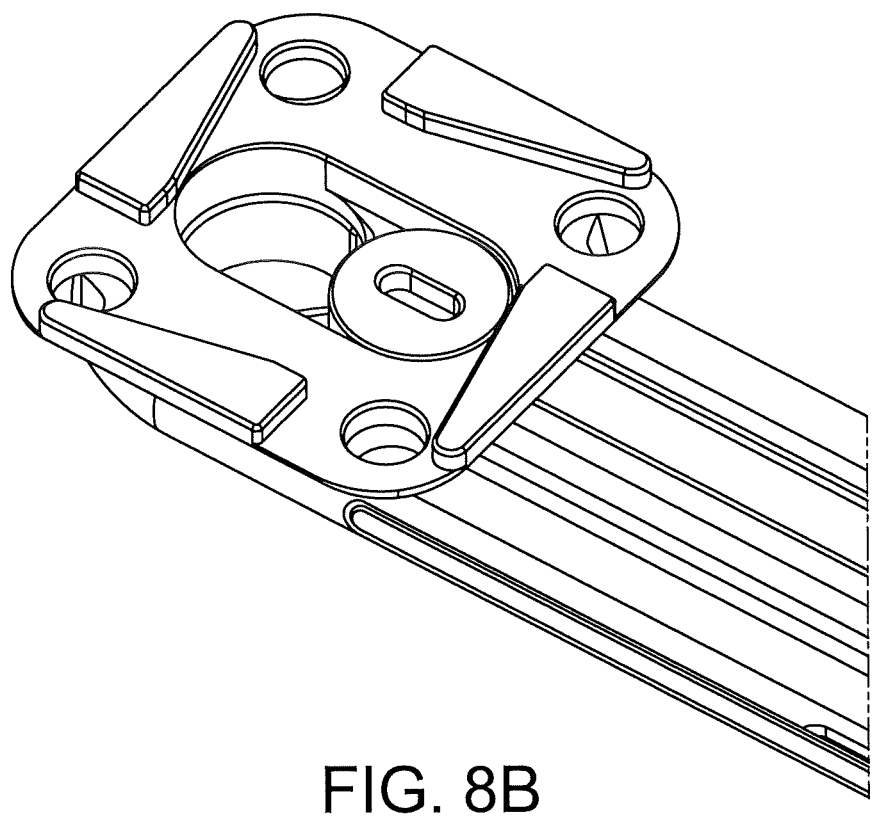
Figure 8C:
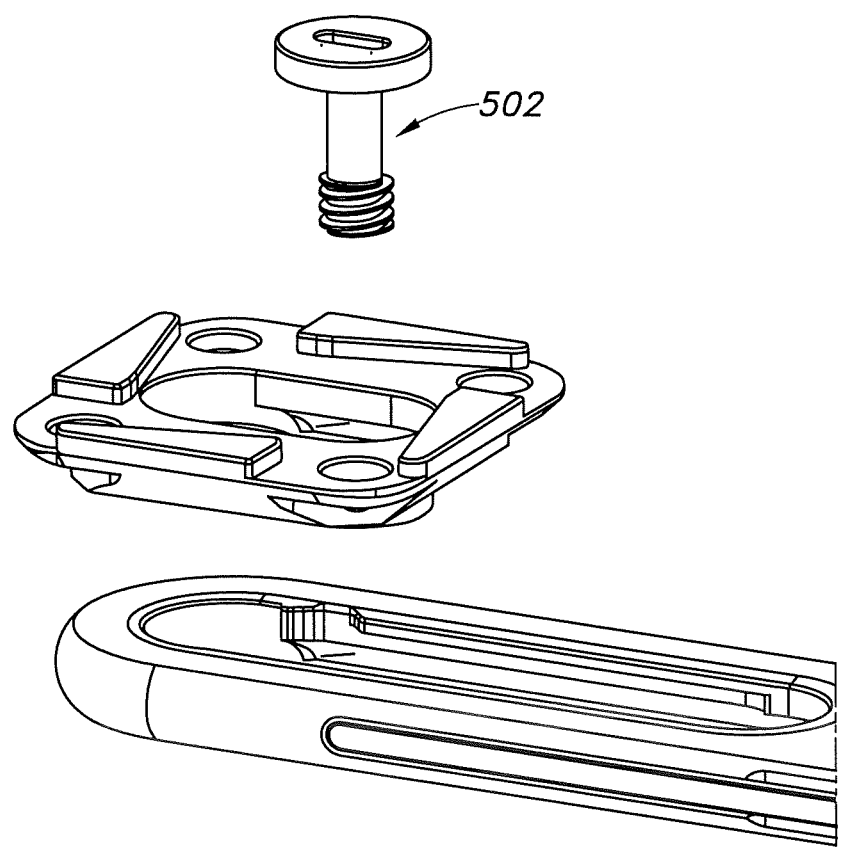
Figure 9:
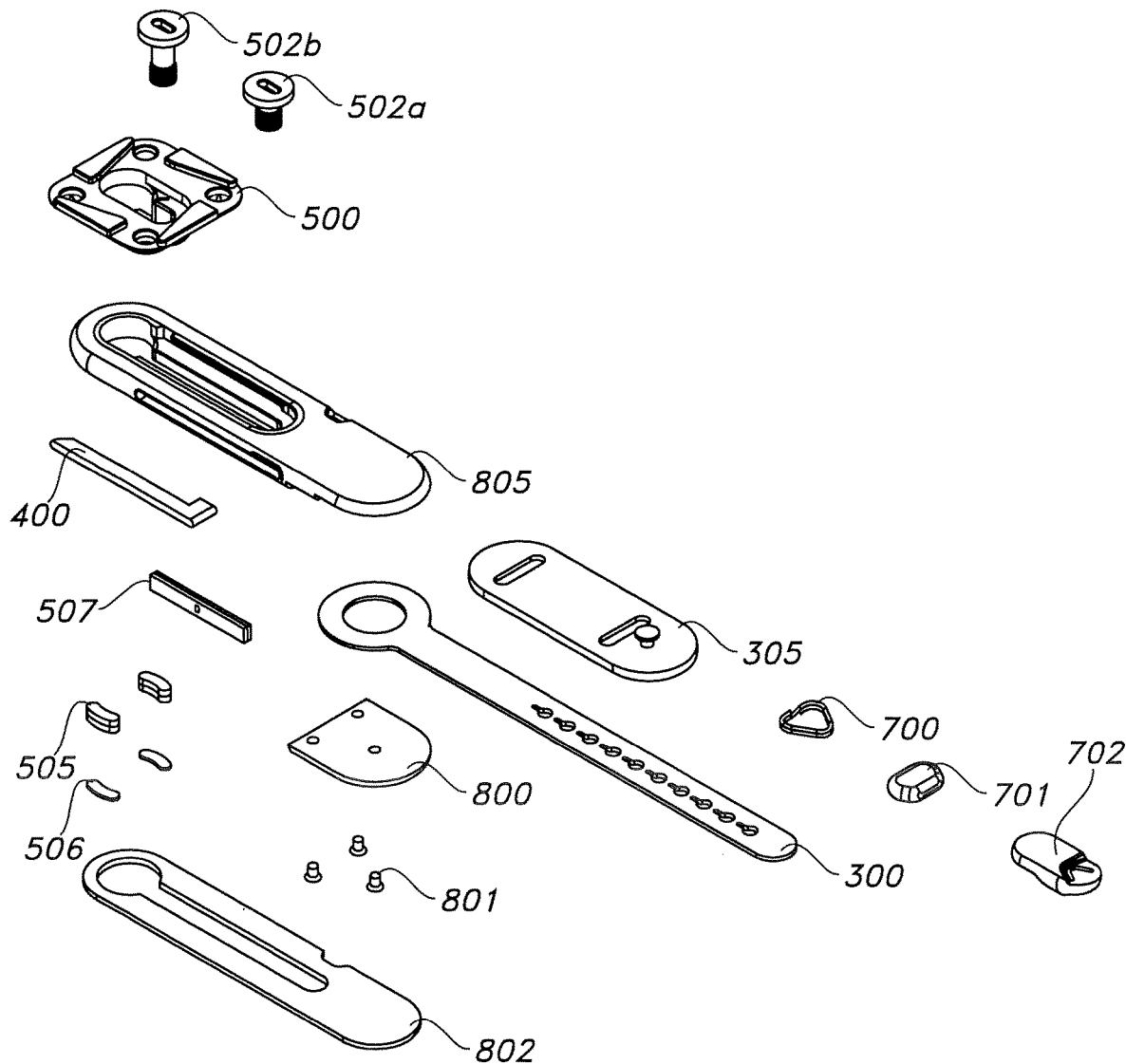
FIG. 9 is a diagram depicting individual elements of a camera clutch system of this disclosure.
Figure 10A:
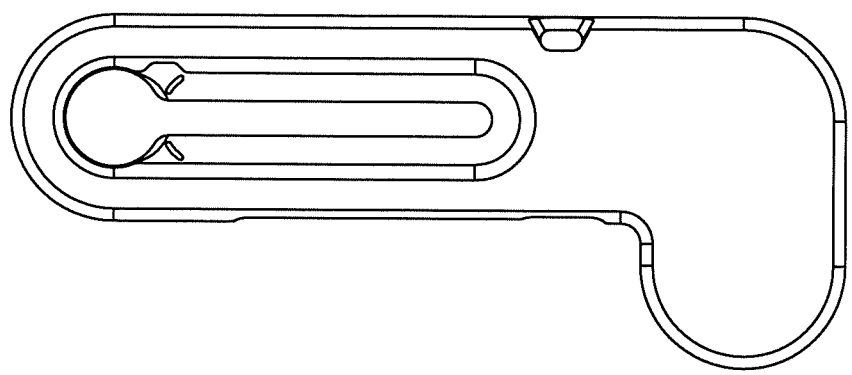
FIGS. 10A and 10B are diagrams of a top view (FIG. 10A) and cross-sectional top view (FIG. 10B) of a nonlimiting embodiment of an L-shaped camera plate.
Figure 10B:
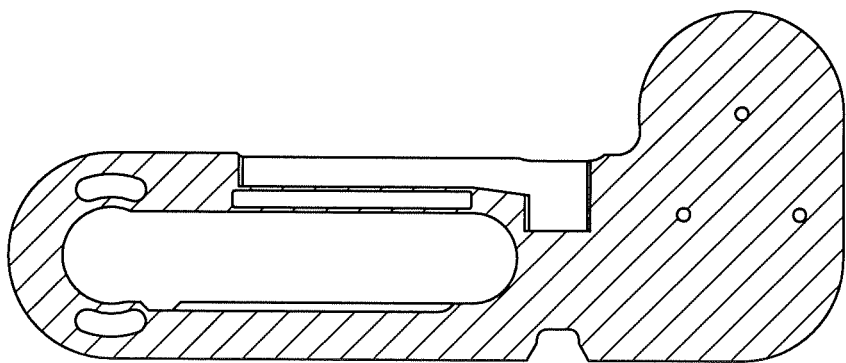
Figure 11:
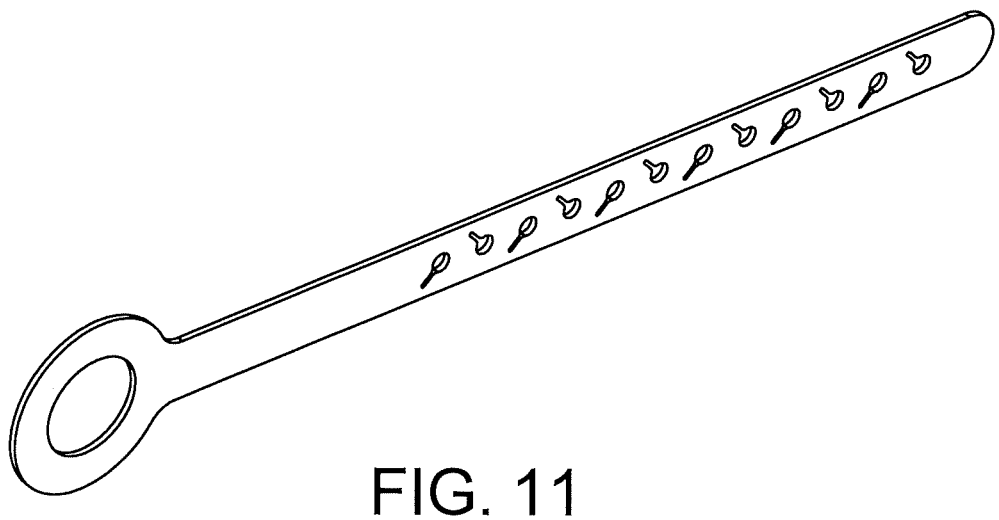
FIG. 11 is a diagram of a nonlimiting embodiment of a strap useful in a camera clutch system of this disclosure.

FIGS. 1 through 11 show various views and embodiments of the camera clutch system 100.

In simplest form, the camera clutch system of this disclosure comprises a camera plate 200 configured to transiently mount to a camera and a strap 300 coupled to the camera plate 200 configured to attach to a camera body or that camera plate and to form an opening or loop configured to accept less than four fingers of a user to secure a camera mounted to the camera plate to the user.

Unlike most conventional hand grip camera straps sized to fit four finger of the user, by "opening or loop configured to accept less than four fingers of a user" as used herein, it is meant that the opening or loop is sized only to fit 3, 2 or 1 finger of an average adult user, more preferably two fingers of an average adult user such as, but not limited to, a ring finger and a middle finger, thereby freeing a least the index finger of the user to operate the camera.

The camera plate 200 of the camera clutch system has an outer face 210 and an inner face 215. In one nonlimiting embodiment, as depicted in, for example, FIGS. 1-4, the camera plate is linear in shape. In an alternative nonlimiting embodiment, as depicted in, for example, FIGS. 5 and 6 the camera plate is L-shaped. However, as will be understood by the skilled artisan upon reading this disclosure, alternate shapes for the camera plated can be used and are encompassed within the scope of this invention.

In one nonlimiting embodiment of this disclosure, the camera plate of the camera clutch system comprises a recess 201 and a channel 202. The recess 201 can be outset or inset (concave or convex) from the outer face 210 of the camera plate 200 opposite the inner face 215 of the camera plate 200 configured to receive a camera and spans a first length 11 across the outer face 210. The channel 202 extends between a base 203 of the recess 201 and the inner face 215 of the camera plate 200 and spans a second length 12 less than the first length 11. The channel 202 is configured to receive a fastener 205 (e.g., a screw) for coupling the camera plate 200 to a camera. The fastener 205 includes a first section 206 (e.g., a screw head) configured to seat within the recess 201 and defining a width greater than the width of the channel 202 and less than the width of the recess 201 and a second section 207 (e.g., a threaded section) extending or protruding from the first section 206, defining a width less than the width of the channel 202, and configured to extend through the channel 202 to mate with a corresponding feature on a camera to couple the camera plate 200 to a camera. In one nonlimiting embodiment, the fastener 205 is substantially flush with the outer face 210 of the camera plate 200.

The camera plate may further comprise an insert 219 arranged within the camera plate 200 adjacent an edge 204 of the camera plate 200 for coupling of the strap 300 to the camera plate. In one nonlimiting embodiment, the insert 219 comprises a boss 225 (e.g., a circular boss) and a strap-receiving section 220 arranged about the boss 225 for pivotably coupling the strap 300 to the camera plate 200. However, as will be understood by the skilled artisan upon reading this disclosure, alternate means for coupling the strap to the camera plate can be used and are encompassed within the scope of this invention.

Additionally and/or alternatively, in one nonlimiting embodiment of the camera clutch system, the camera plate further includes a textile liner 216 (e.g., a padded liner) arranged across the inner face and configured to relieve contact pressure between the camera plate and the camera. In one nonlimiting embodiment, this textile liner comprises ridges to maximize pressure relief. In one nonlimiting embodiment, the textile liner comprises a concave structure with elevated edges so that contact pressure on the perimeter of the textile liner at its edges is greater than at the center of f the textile liner thereby relieving contact pressure.

The strap 300 has a first end 301 coupled to the camera plate 200 and a second end 302 configured to couple with the camera and form an opening or loop configured to receive less than 4 fingers of a user. In one nonlimiting embodiment, the first end of the strap comprises a looped portion configured to seat within the strap receiving section of the insert within the camera plate and pivot about the boss of the insert responsive to rotation of the strap. As will be understood by the skilled artisan upon reading this disclosure, while it is considered an advantage that the strap is able to pivot about a fixed boss, it may also be designed to fixedly attach to the camera plate without the ability to pivot and both embodiments are included within the scope of this invention.

As one of skill in the art would understand upon reading this disclosure, the strap may be comprised of any suitable material. In one nonlimiting embodiment, the strap is formed from a flexible material such as, but not limited to, elastic, leather, flexible plastic, or silicone.

In one nonlimiting embodiment of the camera clutch system, the camera plate 200 further defines a relief 208 extending inward from the inner face 215 arranged about a perimeter of the channel 202 and configured to reduce any torque applied to the camera plate including, but not limited to that applied to the channel and the fastener by the strap (e.g., by a user applying a force on the strap during pivoting and/or carrying of the strap).

The second end of the strap is configured to attach to a camera. In one nonlimiting embodiment, the strap comprises a set of mounting features 308 (e.g., a set of apertures) for adjusting strap size and a protrusion 309 extending from the strap and configured to insert through the apertures to form the opening or loop sized to fit less than 4 fingers of a user. As one of skill in the art would understand upon reading this disclosure, however, alternative means for adjusting strap size such as, but in no way limited to, Velcro, snaps and/or hooks, can be used.

In one nonlimiting embodiment, the width of the strap is configured to fit through an eyelet or other ring coupled to the edge of the camera proximal an upper surface of the camera opposite a lower surface to which the camera plate is seated. In one nonlimiting embodiment, the camera clutch system may further comprise an eyelet or other ring, also referred to as a split ring 700 for coupling the strap to the camera and/or a ring sleeve 701 and/or split ring install tool 702.

In one nonlimiting embodiment, the camera clutch system 100 further includes a tool 400 configured to cooperate with the fastener 205 to mate the fastener with the corresponding feature on the camera to couple the camera plate to the camera. In one nonlimiting embodiment, the tool is transiently mounted to the camera plate. In one nonlimiting embodiment, the camera plate may comprise a cavity inset within a lateral edge of the camera plate into which the tool can be inserted. In one nonlimiting embodiment, a first set of magnetic elements is arranged about the cavity. In this embodiment, the tool may comprise a second set of magnetic elements configured to transiently couple to the first set of magnetic elements arranged about the cavity to retain the tool within the cavity of the camera plate approximately flush with the lateral edge of the camera plate. As will be understood by the skilled artisan upon reading this disclosure, alternative embodiments for transiently attaching the tool to the camera clutch can be used and are within the scope of this disclosure.

In one nonlimiting embodiment, the camera clutch system 100 further comprises a spacer 230 and a tripod-mounting plate 500. In one nonlimiting embodiment, the spacer 230 is configured to seat within the recess 201 approximately flush with the outer face 210 of the camera plate 200 and defines a second channel 235 extending between a first face of the spacer to a second face of the spacer opposite the first face and abutting with the base 203 of the recess and cooperating with the channel to extend between the base of the recess and the inner face of the camera plate to form a unitary channel. The tripod mount 500 is configured to transiently couple the camera plate via a second fastener 502 and receive a tripod in order to mount the camera coupled to the camera plate to the tripod. In one nonlimiting embodiment, the system comprises both a short second fastener 502*a* and a long second fastener 502*b*. In one nonlimiting embodiment, the tripod mount comprises a third section configured with a protuberant to seat within the first face of the spacer and a fourth section protruding from the third section and configured to lodge through an aperture on the mount, the second channel of the spacer, and the channel of the camera plate in order to mate with the corresponding feature on the camera, thereby coupling the camera plate and the mount to the camera.

Generally, the camera clutch system of this disclosure includes a camera plate configured to transiently retain a camera mounted to the camera plate and a "soft" flexible strap coupled, preferably pivotably, to the camera plate and the camera (e.g., via an eyelet of the camera), configured to form a loop that accepts a set of less than 4 fingers (e.g., a ring finger and a middle finger) of a user to secure the camera mounted to the camera plate to the user for added security when the user holds the camera. When configured to pivot, the clutch can pivot nearly a full 180-degrees about an edge of the camera (e.g., orthogonal the camera plate), such that the user may adjust a grip on the camera. Therefore, the camera clutch system of this disclosure enables the user to support the camera via the strap with as few as two fingers, while enabling the user's remaining fingers (e.g., index finger, thumb) to freely operate controls (e.g., shutter speed, touch pad) of the camera and/or grip the camera.

The camera plate of this disclosure is configured to receive a camera (e.g., a bottom surface of a camera) on an inner face of the camera plate. The camera plate defines a central channel (e.g., an elongated bore) extending a length of the camera plate extending between the outer and inner face of the camera plate. The channel is configured to receive a portion (i.e., the second section) of a fastener (e.g., a threaded section of a screw inserted from the outer face of the camera plate and extending through the channel for rigidly coupling the camera plate to the camera via mating of the fastener (or "primary fastener") with a corresponding feature (e.g., a bore defining a set of inner threads) on the bottom surface of the camera. The fastener can be located at any position along the channel of the camera plate, thereby enabling the camera plate to be mounted to the camera regardless of the location of the corresponding feature on the camera that receives the fastener.

Further, in one nonlimiting embodiment, the camera plate comprises a recess inset from the outer face of the camera and arranged about the channel configured to retain a portion (i.e., the first section) of the fastener (e.g., a screw head) within the recess, such that the fastener retains the camera plate against the camera. The channel can thus define a width less than a width of the recess and a length extending along a plane defined by the camera plate slightly less than a length of the recess such that a threaded section of the fastener extends through the channel while a first section (or "screw head") of the fastener defining a width greater than the width of the channel and less than a width of the recess seats within the recess approximately flush with the outer face of the camera plate such that the fastener does not visibly or tactilely protrude from or fall below the outer face of the camera plate. Accordingly, the camera clutch system of this disclosure can support the camera leveled on a flat surface regardless of the location of the fastener along the channel and the position of the camera plate mounted to the bottom surface of the camera.

The strap can include a first end coupled to the camera plate at an insert arranged within the camera plate and a second end configured to couple with a coupling feature of the camera to form the loop configured to receive less than 4 fingers of a user. Preferred is that the strap be pivotably coupled to the camera plate. In this nonlimiting embodiment, the coupling feature of the camera and the insert of the camera plate cooperate to define a pivot axis about which the strap pivots responsive to rotation or a force applied by a user engaging the strap. In one nonlimiting embodiment, the camera plate can include an insert arranged within the camera plate such as in a particular region configured to align (e.g., vertically) with the coupling feature of the camera when mounted on the camera plate and including a substantially rounded boss defining a strap-receiving section arranged about the boss. The first section of the strap can define a looped section that seats within the strap-receiving section of the insert around the rounded boss, such that when a user applies a force to the strap, the looped section of the strap rotates about the rounded boss, thereby enabling the strap to smoothly pivot about the pivot axis.

The camera clutch system of this disclosure enables the loop formed by the strap to freely pivot about the boss thereby enabling the user to pivot the strap relative to the camera.

Furthermore, the camera clutch system of this disclosure can be configured to minimize pressure (e.g., a torque) applied to a central region of the camera plate, including the channel and the fastener inserted through the channel and coupled to the camera, by including a relief arranged about this central region on the inner face of the camera plate. In this nonlimiting embodiment, the camera plate can include a relief extending inward from the inner face of the camera plate and arranged about a perimeter of the channel. In this nonlimiting embodiment, the pressure applied to the camera plate by the fastener and proximal to the fastener is relieved (i.e., distributed about the inner face of the camera plate), thereby reducing the torque applied to the fastener due to the pivoting motion of the strap. By including this relief, the camera plate can distribute pressure (e.g., torque) applied to the camera plate toward outer regions of the camera plate and away from this central region of the camera plate in order to reduce failure of the camera plate and/or decoupling of the camera plate from the camera and/or strap such as due to application of a torque on the camera plate during pivoting of the strap.

In one nonlimiting embodiment, the camera clutch system of this disclosure is configured to receive a tripod-mounting plate configured to couple to the camera plate on the outer surface opposite the camera mounted to the inner surface of the camera plate to enable mounting of the camera and the camera clutch system of this disclosure to a tripod. In one nonlimiting embodiment, the camera clutch system of this disclosure is configured to retain the tripod-mounting plate against the outer surface of the camera plate and the camera against the inner surface of the camera plate with a singular fastener configured to insert through a threaded bore of the tripod-mounting plate (e.g., from a bottom surface of the tripod-mounting plate) and extend through the channel of the camera plate (e.g., in a particular position within the channel) and mate with the corresponding feature of the camera to couple both the tripod-mounting plate and the camera plate to the camera. In this nonlimiting embodiment, the camera clutch system may further comprise a spacer spanning a depth and circumference of the recess in the camera plate configured to seat within the recess approximately flush with the outer face of the camera plate and defining a second channel cooperating with the channel on the camera plate to define a unitary channel. In this nonlimiting embodiment, the tripod-mounting plate may define an aperture and be configured to receive a second fastener extending a length greater than the length of the primary fastener configured to lodge through the aperture, through the second channel of the spacer, and through the channel of the camera plate, to mate with the corresponding feature of the camera plate.

By including the spacer within the recess when the tripod mounting plate is coupled to the camera plate, the camera clutch system can increase contact surface area between the camera plate and tripod-mounting plate. Further, by including the spacer within the recess and thus extending a depth (e.g., between the bottom surface of the camera and the bottom surface of the tripod-mounting plate) of the unitary channel, the camera clutch system of this disclosure can enable coupling of the tripod mounting plate and the camera clutch system to the camera plate via insertion of a singular fastener through this unitary channel and into the corresponding feature of the camera configured to receive the fastener. A user may therefore mount the camera via a singular fastener-receiving feature (e.g., a threaded bore) arranged on a bottom surface of the camera to both the camera clutch system and the tripod-mounting plate. Further, the user can adjust a position of the fastener within the unitary channel in order to adjust a position the camera relative the camera-mounting plate, such that when the user couples the camera-mounting plate to a tripod, the user's camera seats vertically in-line with a central axis of the tripod.

In one nonlimiting embodiment, the camera clutch system includes a pad 305 coupled to the strap 300 configured to rest on a dorsal side of a user's fingers (e.g., opposite the palmar side of the user's middle finger and ring finger) when securing the camera to the user.

In one nonlimiting embodiment, the strap defines a first end pivotably coupled to the camera plate and a second end configured to couple with the camera to form the loop configured to receive less than 4 fingers of a user. It is important to note that while a loop is the primary shape that would be desired, other shapes including handles, bars, rings and other shapes may be configured for a user. In one nonlimiting embodiment, the pad is located between the first end and the second end of the strap. The strap further includes a protrusion configured to mate with a set of mounting features (e.g., a set of apertures) of the strap. Additionally, in this nonlimiting example, the strap is configured to reach from the first end pivotably coupled to the camera mount at a bottom end of the camera upward through an eyelet of the camera to define the second end of the strap. The set of mounting features of the strap can mate with the protrusion of the pad to mount the strap to the eyelet and therefore mount the strap to the camera while forming the loop configured to receive the less than 4 fingers of the user. As a user secures their fingers (e.g., middle finger and ring finger) through the loop formed by the strap, the inner surface of the pad is configured to rest on the dorsal side of the user's fingers, thereby extending the surface area of the strap that supports the user's fingers. Furthermore, in this nonlimiting example, the strap is formed of a flexible material (e.g., elastic, flexible plastic, silicone) configured to return to a resting length in response to an applied force by the user to extend the strap when pivoting the camera.

Therefore, the user can support the camera with less than 4 (e.g., the user's middle finger and ring finger) while allowing the user's remaining fingers (e.g., index finger, thumb) to freely operate controls (e.g., shutter speed, touch pad) of the camera. Additionally, the camera clutch system of this disclosure allows for the strap to conform to a user's fingers when securing the camera to the user and when applying a pivoting motion to the strap by the user.

Generally, the camera clutch system of this disclosure includes a camera plate defining a recess inset from an outer face of the camera plate and spanning a length across the outer face and a channel extending between a base of the recess and an inner face of the camera plate with an inner face opposite to the outer face configured to receive a camera. As previously recited herein, the recess may also be formed to be outset from the outer face of the camera plate if desired.

In one nonlimiting embodiment, the camera plate comprises a first portion defining the outer face of the camera plate and the recess inset from the outer face and a second portion coupled to the first portion to form the camera plate and define the inner face of the camera plate. In this nonlimiting embodiment, the recess defines a recess width defining a base of the recess, a recess depth inset from the outer face of the first portion defining inner walls extending from the base of the recess, and a recess length partially spanning the outer face of the first portion.

Further, in this nonlimiting embodiment, the channel defines a first channel partially spanning a first channel length across the base of the recess on the first portion of camera plate and a second channel partially spanning a second channel length across the inner face of the second portion and cooperating with the first channel, wherein the first portion couples with the second portion to form the camera plate to define the channel extending between the base of the recess and the inner face of the camera plate.

Additionally, in the foregoing nonlimiting embodiment, the channel is configured to receive a fastener to transiently mount the camera plate to a corresponding feature on the camera. The fastener includes a first section (e.g., a fastener head) configured to seat within the recess approximately flush with the outer face of the camera plate; and a second section (e.g., a threaded section of the fastener) protruding from the first section and configured to lodge through the channel to mate with the corresponding feature on the camera to couple the camera plate to the camera.

The first section of the fastener defines a first section width less than the recess width, a first section depth approximately equal to the recess depth such that the first section seats approximately flush with the outer face of the camera plate, and a drive (e.g., slotted, square) configured to receive a tool in order to apply a torque by a user to mate the fastener to the corresponding feature of the camera.

The second section defines a second section width less than the first section width and the recess width such that the second section lodges through the channel extending between the base of the recess and the inner face of the camera plate to mate with the corresponding feature on the camera. In this example, the corresponding feature on the camera defines a bore including a set of inner threads (e.g., the tripod mount located on a bottom end of the camera) configured to mate with a set of outer threads of the second section of the fastener.

Accordingly, the camera clutch system can transiently mount the camera plate to a camera regardless of the location of the corresponding mounting feature on the camera that receives the fastener and support the camera plate leveled on a flat surface regardless of the position of the camera plate mounted to the camera.

In one nonlimiting embodiment, the camera plate further defines a relief configured to relieve pressure applied to the camera plate proximal the fastener. As described herein, the strap can be pivotably coupled to the camera plate, thereby enabling the user to pivot the strap relative the camera. However, the pivoting motion applied to the strap can result in a torque applied to the fastener, thereby de-coupling the fastener from the corresponding feature on the camera. To prevent the camera plate from being unintentionally removed from the camera, the camera plate can define a relief about the channel on the inner face to relieve pressure on the camera plate proximal the fastener. In the event that the recess is desired to be outset the relief can be located on the outer face.

In one nonlimiting embodiment, the relief defines a swept cut: extending inward from the inner face of the camera plate arranged about a perimeter of the channel and configured to reduce a torque applied to the fastener by the user pivoting the strap on a region of the camera plate proximal the channel. In this nonlimiting embodiment, the head section of the fastener nested within the recess applies a pressure on the camera plate. The relief reduces pressure on the camera plate proximal the fastener, thereby reducing torque experienced by the fastener resulting from pivoting the strap coupled to the camera plate.

In another nonlimiting embodiment, the relief defines a first support and a second support. The first support is located at a first end of the inner face of the camera plate configured to receive the camera and relieves pressure applied to the camera plate proximal the fastener. The second support is located at a second end of the inner face of the camera plate configured to receive the camera and cooperates with the first support to relieve pressure applied to the camera plate proximal the fastener.

In this nonlimiting embodiment, the first support and the second support define a primary contact area of the camera plate to the camera, thereby alleviating the contact pressure of the camera plate proximal to the fastener.

In yet another nonlimiting embodiment, the relief defines a combination of a swept cut, a first support, and a second support on the inner face of the camera plate configured to relieve pressure applied to the camera plate proximal the fastener.

In one nonlimiting embodiment, the camera clutch system further includes a tool retained within the camera plate approximately flush with a lateral edge of the camera plate and configured to couple a drive of the first section of the fastener to receive a torque by the user in order to mate the fastener with the corresponding feature of the camera, thereby mounting the camera plate to the camera.

In one nonlimiting embodiment, the tool defines a first portion (e.g., a flat head tip) configured to receive the drive of the first section of the fastener and a second portion (e.g., shank) extending normal from the first portion and configured to support a user operating the tool to apply a torque to the fastener received by the first portion. In this nonlimiting embodiment, the camera plate further defines a cavity inset from a lateral edge of the camera plate which cooperates with the first portion and the second portion of the tool and is configured to nest the tool within the cavity such that the tool remains flush with the lateral edge of the camera plate when nested within the cavity.

Furthermore, in this nonlimiting embodiment, the cavity may include a first set of magnets 505 arranged on a base of the cavity configured to receive the second portion of the tool. Such magnets may include magnet covers 506. The second portion of the tool may also include a magnet or second set of magnets 507 arranged within the second portion of the tool and configured to transiently mate with the first set of magnets on the base of the cavity to retain the tool within the cavity of the camera plate and position the tool flush with the lateral edge of the camera plate.

In this nonlimiting embodiment, the tool can be seamlessly retained within the camera plate and removed by a user to support coupling and de-coupling the fastener, and thereby the camera plate, from the corresponding feature on the camera.

In one nonlimiting embodiment, the camera plate further comprises a slot 600 disposed at a target location about the camera plate configured to transiently mount a cuff supported on a wrist of the user to the camera plate. In one nonlimiting embodiment, the slot 600 comprises a cut portion fabricated on a lateral edge at a first end of the camera plate and is configured to receive a cuff mounting section (e.g., a looped thread coupled to the cuff) to transiently mount the cuff to the camera plate. In this nonlimiting embodiment, the cuff can support the wrist of a user while the loop defined by the strap supports a user's fingers thereby preventing the camera from being physically removed from the user in the event a user removes their fingers from the strap.

In one nonlimiting embodiment, the camera clutch system of this disclosure includes a camera plate including an insert arranged within the camera plate and adjacent an edge of the camera plate. In this implementation, the strap pivotably couples the insert of the camera plate and therefore enables the user to pivot the loop defined by the strap when mounted to the camera.

In one nonlimiting embodiment, the insert includes a boss 225 (e.g., a circular boss) and a strap receiving section 220 arranged about the boss 225. The boss protrudes from a base section of the first portion of the camera plate and has a boss height greater than or equal to the height of the first end of the strap. The strap-receiving section 220 is arranged about the boss. In this nonlimiting embodiment, the first end of the strap is configured to mount to the strap-receiving section arranged about the boss of the insert. In particular, in this nonlimiting example, the first end of the strap comprises a looped portion configured to seat within the strap-receiving section around the boss and includes a rigid member (e.g., a rigid circular member) embedded within the looped portion at the first end.

In one nonlimiting embodiment, the camera plate of the camera clutch system comprises a plate pivot cover 800 with pivot cover fasteners 801 and a plate landing pad 802 which fits into a plate main body 805 to enclose the pivotably coupling insert.

Therefore, the first end of the strap is pivotably arranged between the first portion and the second portion of the camera plate to enable the camera clutch system of this disclosure to conform to the motion of a user's hand when supporting the camera via the strap.

In another nonlimiting embodiment, the insert further includes a retaining element configured to maintain the first end of the strap in a target position (e.g., a home position).

For example, the retaining element may include a first magnetic element arranged on a first sub-section of the strap-receiving section and configured to transiently couple a second magnetic element arranged on the rigid member at the first end of the strap. In this nonlimiting example, the second magnetic element of the rigid member aligns with the first magnetic element of the strap-receiving section to define the target position of the insert.

In this nonlimiting embodiment, during pivoting of the strap, the strap is retained at the target position, thereby increasing stability of the camera clutch system of this disclosure for the user. In response to application of a torque exceeding a magnetic coupling force by the user during pivoting of the strap of the first magnetic element and the second magnetic element, the first magnetic element decouples the second magnetic element to freely allow the strap to pivot within the insert, thereby increasing flexibility for the user supporting the camera.

In yet another nonlimiting embodiment, the insert includes a first set of retaining elements configured to maintain the first end of the strap in a set of target positions. Therefore, the first end of the strap can pivot from a first position (e.g., a home position) to a second position (e.g., offset from the home position) during pivoting motion of the strap by the user during support of the camera.

In one nonlimiting embodiment, the camera clutch system of this disclosure further comprises a spacer 230 configured to seat within the recess approximately flush with the outer face of the camera plate and defining a second channel cooperating with the channel extending between the base of the recess and the inner face of the camera and a tripod-mounting plate configured to transiently couple the camera plate via a second fastener and receive a tripod in order to mount a camera coupled to the camera plate—to the tripod.

In one nonlimiting embodiment, the spacer has spacer height approximately equal to the recess depth of the recess in order to seat the spacer approximately flush with the outer face of the camera plate, a spacer length approximately equal to the recess length, and a spacer width less than the recess width in order to enable the spacer to seat within the recess. Additionally, the spacer may define a second channel extending from a first face of the spacer to a second face of the spacer opposite the face and cooperating with the channel extending between the base of the recess and the inner face of the camera plate to form a unitary slot configured to receive the second fastener.

In one nonlimiting embodiment, the tripod-mounting plate includes an aperture configured to receive the second fastener and is configured to transiently mount a structure (e.g., a tripod).

In the foregoing nonlimiting example, the second fastener is configured to transiently couple the camera plate to the corresponding feature on the camera and the tripod-mounting plate to the same corresponding feature on the camera. The second fastener includes a third section (e.g., fastener head) and a fourth section (e.g., a threaded section of the fastener).

In this nonlimiting embodiment, the fourth section has a length greater than a second section length and is configured to lodge through the aperture of the tripod-mounting plate, the second channel of the spacer, and the channel extending between the base of the recess and the inner face of the camera plate in order to mate the second fastener to the corresponding feature (e.g., a bore defining a set of inner threads) of the camera. Additionally, the third section comprises a drive (e.g., slotted, square) configured to receive the same tool disclosed herein in order to apply a torque by a user to mate the second fastener to the corresponding feature of the camera and seat a protuberant on the outer face of the tripod mount when the second fastener is mated to the corresponding feature of the camera.

A significant advantage of the camera clutch system of this disclosure is that the second fastener can be rotated less than a full rotation to allow the entire assembly to be slid in a longitudinal direction relative to a camera body for easy access to the battery or memory card of a camera.

Further, the camera clutch system of this disclosure can transiently mount each of the camera plate and the tripod-mounting plate to the corresponding feature of the camera, thereby eliminating the need to shift a mounting location of the camera to the structure (e.g., tripod).

A person skilled in the art will recognize from the aforementioned detailed description and from the figures and claims, modifications and changes can be made to the embodiments of the invention without departing from the scope of this invention as defined in the following claims.

The invention claimed is:

1. A camera clutch system comprising:
   a) a camera plate with an inner face and an outer face and a first end and second end wherein the first end of the camera plate comprises a channel with a recess and a fastener which slidably fits within the channel and recess for coupling the camera plate to a camera; and
   b) a strap with a first end and second end coupled directly to the camera plate via the first end of the strap and configured to attach to a camera body or the camera plate via the second end to form an opening or loop sized to accept less than four fingers of a user to secure a camera mounted to the camera plate to the user.

2. The camera clutch system of claim 1 wherein the strap is pivotably coupled directly to the camera plate at the second end of the camera plate via the first end of the strap.

3. The camera clutch system of claim 2 wherein the strap is pivotably coupled via the first end of the strap directly to the camera plate at the second end of the camera plate via a boss and strap receiving section arranged about the boss in the camera plate.

4. The camera clutch system of claim 1 further comprising a tool transiently mounted to the camera clutch system and configured to cooperate with the fastener to mate the fastener with a corresponding feature on a camera to couple the camera plate to the camera.

5. The camera clutch system of claim 4 where the camera plate comprises a cavity into which the tool is mounted.

6. The camera clutch system of claim 5 further comprising a first set of magnetic elements arranged about the cavity and a second set of magnetic elements in the tool arranged to retain the tool within the cavity of the camera plate approximately flush with a lateral edge of the camera plate.

7. The camera clutch system of claim 1 wherein the inner face of the camera plate further comprises a textile liner to relieve contact pressure between the camera plate and a camera transiently mounted thereto.

8. The camera clutch system of claim 1 further comprising a pad coupled to the strap and configured to rest on a dorsal side of a user's fingers opposite a palmar side of the user's middle finger and ring finger when securing a camera to the user.

9. The camera clutch system of claim 1 further comprising a second fastener to transiently couple the camera plate to a tripod, said second fastener comprising a protrusion which fits within the recess or channel of the camera plate.

10. The camera clutch system of claim 1 wherein the slidably fitted fastener allows for rotation of a mounted camera to provide access to a battery or memory card of a camera without removing the camera plate.

* * * * *